United States Patent
Blei et al.

(10) Patent No.: US 9,229,440 B2
(45) Date of Patent: Jan. 5, 2016

(54) METHOD FOR THE CONFIGURATION OF A CONTROL DEVICE

(71) Applicant: ABB AG, Mannheim (DE)

(72) Inventors: Brigitte Blei, Berlin (DE); Jürgen Stoll, Brühl (DE); Gernot Gaub, Hockenheim (DE)

(73) Assignee: ABB AG, Mannheim (DE)

( * ) Notice: Subject to any disclaimer, the term of this patent is extended or adjusted under 35 U.S.C. 154(b) by 563 days.

(21) Appl. No.: 13/735,430

(22) Filed: Jan. 7, 2013

(65) Prior Publication Data

US 2013/0144406 A1 Jun. 6, 2013

Related U.S. Application Data

(63) Continuation of application No. PCT/EP2011/003224, filed on Jun. 30, 2011.

(30) Foreign Application Priority Data

Jul. 7, 2010 (DE) .......................... 10 2010 026 494

(51) Int. Cl.
*G05B 13/02* (2006.01)
*G05B 19/02* (2006.01)
*G05B 19/05* (2006.01)

(52) U.S. Cl.
CPC .............. *G05B 19/02* (2013.01); *G05B 19/054* (2013.01); *G05B 2219/1141* (2013.01); *G05B 2219/1143* (2013.01)

(58) Field of Classification Search
CPC .............................. G05B 19/02; G05B 19/054
USPC ......................................................... 700/28
See application file for complete search history.

(56) References Cited

U.S. PATENT DOCUMENTS 6,449,624 B1   9/2002  Hammack et al.
7,818,465 B2  10/2010  Chen et al.
(Continued)

FOREIGN PATENT DOCUMENTS

DE         100 51 645 A1    8/2001
DE         100 15 423 A1   10/2001
DE         101 55 586 A1    5/2003
DE    10 2004 007 231 A1    9/2005
(Continued)

OTHER PUBLICATIONS

International Search Report (PCT/ISA/210) issued on Nov. 9, 2011, by the European Patent Office as the International Searching Authority for International Application No. PCT/EP2011/003224.

*Primary Examiner* — Robert Fennema
*Assistant Examiner* — Sivalingam Sivanesan
(74) *Attorney, Agent, or Firm* — Buchanan Ingersoll & Rooney PC

(57) ABSTRACT

Exemplary embodiments are directed to a system and method for configuring a control device in an automation system. The system including a hardware structure, and a programming tool connected to the hardware structure and the control device. The programming tool is configured to transmit a control program and configuration files to the control device, and store a control project in memory. The programming tool registers modifications of the hardware devices using software "FlexConf.ini" as modification information and sets the control device to a mode "control with flexible configuration" via a parameter "FlexControl". The programming tool also determines a type for transmitting the modification information in the parameter "FlexControl", and transmits the modification software with the modification information stored therein in accordance with the transmission type set in the parameter "FlexControl" to the control device. The control device then parameterizes the hardware devices and transitions into a "RUN" operating mode.

22 Claims, 9 Drawing Sheets

(56) References Cited

U.S. PATENT DOCUMENTS

| | | |
|---|---|---|
| 2008/0140888 A1 | 6/2008 | Blair et al. |
| 2008/0155066 A1* | 6/2008 | Danz .................. G05B 19/042 709/220 |
| 2009/0077270 A1* | 3/2009 | Chen .................. G05B 19/0428 710/2 |
| 2009/0265020 A1 | 10/2009 | Blair et al. |

FOREIGN PATENT DOCUMENTS

| | | | |
|---|---|---|---|
| DE | 10 2004 056 363 A1 | 6/2006 | |
| DE | 10 2008 035 654 A1 | 2/2009 | |
| DE | 102008035654 A1 * | 2/2009 | ......... G05B 19/0426 |
| DE | 10 2007 053 078 A1 | 3/2009 | |
| EP | 2 042 952 A1 | 4/2009 | |
| WO | WO 2007/149688 | 12/2007 | |

* cited by examiner

METHOD FOR THE CONFIGURATION OF A CONTROL DEVICE

RELATED APPLICATIONS

This application is a continuation under 35 U.S.C. §120 of International Application PCT/EP2011/003224 filed on Jun. 30, 2011, designating the U.S., and claiming priority to German application 10 2010 026 494.6 filed in German on Jul. 7, 2010, the contents of each application is hereby incorporated by reference in its entirety.

FIELD

The disclosure relates to a method for configuring a control device, such as a programmable logic controller (PLC), in a modularly constructed control or automation system having a flexibly expandable hardware structure.

BACKGROUND INFORMATION

Known automation systems for controlling a technical process or a technical installation can comprise a control device (PLC), which communicates with the input/output units and/or field units of the automation system via communication couplers.

Before the control system can be used, the hardware provided therefor is mapped in a programming tool, also called engineering tool, as part of the PLC or control project. In the control project, information about input/output addresses of said hardware is stored and made accessible to the application program.

In order that the inputs and outputs of the hardware of the system can be addressed, the control device and the input/output units firstly have to be configured in accordance with the respective customer-specific specification, which is also designated hereinafter as control configuration. This configuration can be supported by the programming tool. The control configuration created is used to map the combination of the hardware (for example input/output units, communication couplers) of the automation system among one another. The control configuration is part of the PLC or control project and is transmitted into the control device via an interface integrated in the engineering tool (for example by means of the control builder AC500 used by ABB). The above-described method for configuring the control device is described for example in IEC 61131-3.

The mapping of the hardware of the automation system in the control project, as provided by means of the control configuration, comprises, inter alia, the following information. General parameters of the CPU of the control device of the system, number of input/output units which are to be connected to the control device via a proprietary input/output bus or via a field bus, inputs and outputs of all the units connected to the bus, parameterization of the input/output units, configuration of the inputs and outputs of the units, parameterization of the input/output channels of the input/output units, setting of the operating mode and the parameters of the serial interfaces of the system, and/or type, general parameters and protocols of the communication couplers used or of the communication network used.

When the PLC is started up, the control configuration previously project-planned and stored in the project is compared with the hardware actually present, for example the input/output units connected to the PLC, which is also designated as verification. Furthermore, the input/output units are parameterized in accordance with the control configuration. In this case, if the actual hardware used in the system does not correspond to the hardware project-planned in the control configuration, for example if not all of the project-planned input/output units of the automation system are connected, the control or application program of the PLC is not started and, if appropriate, an error message is generated.

Consequently, the PLC is only started if all the units provided or entered in the automation system, such as input/output units and communication couplers, are connected and parameterized.

If, in the automation system thus configured, however, some hardware devices are not specified in a further customer-specific expansion stage, the control or application program of the PLC cannot be started. In that case, for said customer-specific expansion stage, which concerns, alongside the changes in the number of input/output units, also changes in the parameterization of the input/output unit, changes in the parameterization of a channel of an input/output unit or the exchange of the communication couplers, the control project has to be adapted in accordance with the customer specification and the control configuration has to be correspondingly changed and transmitted anew into the PLC. In this case, the control configuration is designated as a non-flexible or rigid control configuration.

By means of the rigid control configuration it is not possible, in a control project once it has been created, to cover modifications of the hardware, for machine parts that are not present, for example. The control configuration should be revised in accordance with the now changed control project in the engineering tool and once again be transmitted into the control device and performed.

For automation systems having a flexibly expandable control and communication structure, for example, in modularly constructed control systems, as described for example in DE 10 2004 056 363 A1, a reconfiguration of the control system is associated with a not inconsiderable outlay in terms of time and costs.

SUMMARY

An exemplary method for configuring a control device in an automation system is disclosed, the automation system having a flexibly expandable hardware structure, the hardware structure including a programming tool, which is connected to the control device and transmits a user or control program and configuration files, and in the programming tool a control project with hardware devices of the automation system being included in the control project and a combination of the hardware devices of the automation system among one another is mapped, the method comprising: registering, in the programming tool, modifications of the hardware devices using modification software "FlexConf.ini" as modification information; setting, in a parameter unit, the control device to be connected to the programming tool to Control with flexible configuration mode, using a parameter "Flex-Control"; determining a type for the transmission of the modification information in the parameter "FlexControl"; storing, in the programming tool, the modification software with the modification information in accordance with a transmission type previously set in the parameter "FlexControl" for transmission to the control device; and transmitting, to the control device, the user or control program, the configuration files, and the modification software with the modification information contained therein, wherein the transmitted configuration data in the control device are adapted to the transmitted modification information, copy lists for inputs and outputs of the hardware used are created in accordance with the stored modification information, so that the hardware structure is parameterized.

An exemplary system for configuring a control device in an automation system is disclosed. The system comprising: a flexibly expandable hardware structure; and a programming tool connected to the hardware structure and the control device, the programming tool being configured to transmit a user or control program and configuration files to the control device, and store the control project in memory, wherein the control project maps hardware devices of the automation system to the control project and a combination of hardware devices of the automation system to one another, wherein the programming tool is configured to register modifications of the provided hardware devices using software "FlexConf.ini" as modification information and, set the control device to a mode "control with flexible configuration" via a parameter "FlexControl" using a parameter unit, determine a type for the transmission of the modification information in the parameter "FlexControl", transmit the modification software with the modification information stored therein in accordance with the transmission type set in the parameter "Flex-Control" to the control device, wherein the control device is configured with the control program, the configuration files, the modification software with the modification information contained therein, and an adaptation of the transmitted configuration data to the transmitted modification information, to establish copy lists for inputs and outputs of the used hardware devices in accordance with the stored modification information such that the hardware devices are parameterzied and the control device transitions into a "RUN" operating mode.

An exemplary computer readable medium for performing a method of configuring a control device in an automation system is disclosed, the automation system having a flexibly expandable hardware structure, the hardware structure including a programming tool, which is connected to the control device and transmits a user or control program and configuration files, and in the programming tool a control project with hardware devices of the automation system being included in the control project and a combination of the hardware devices of the automation system among one another is mapped, which when the computer readable medium is placed in communicable contact with a processor of the programming tool, causes the programming tool to perform the steps of: registering modifications of the hardware devices using modification software "FlexConf.ini" as modification information; setting the control device to be connected to the programming tool to Control with flexible configuration mode, using a parameter "FlexControl"; determining a type for the transmission of the modification information in the parameter "FlexControl"; storing the modification software with the modification information in accordance with a transmission type previously set in the parameter "FlexControl" for transmission to the control device; and transmitting, to the control device, the user or control program, the configuration files, and the modification software with the modification information contained therein, to establish copy lists for inputs and outputs of the hardware structure used, parameterize the hardware structure, and place the control device into a "RUN" operating mode.

BRIEF DESCRIPTION OF THE DRAWINGS

The disclosure and exemplary embodiments and improvements of the disclosure will be explained and described in greater detail on the basis of the exemplary embodiments illustrated in the following figures.

In the figures.

DETAILED DESCRIPTION

Figure 1:
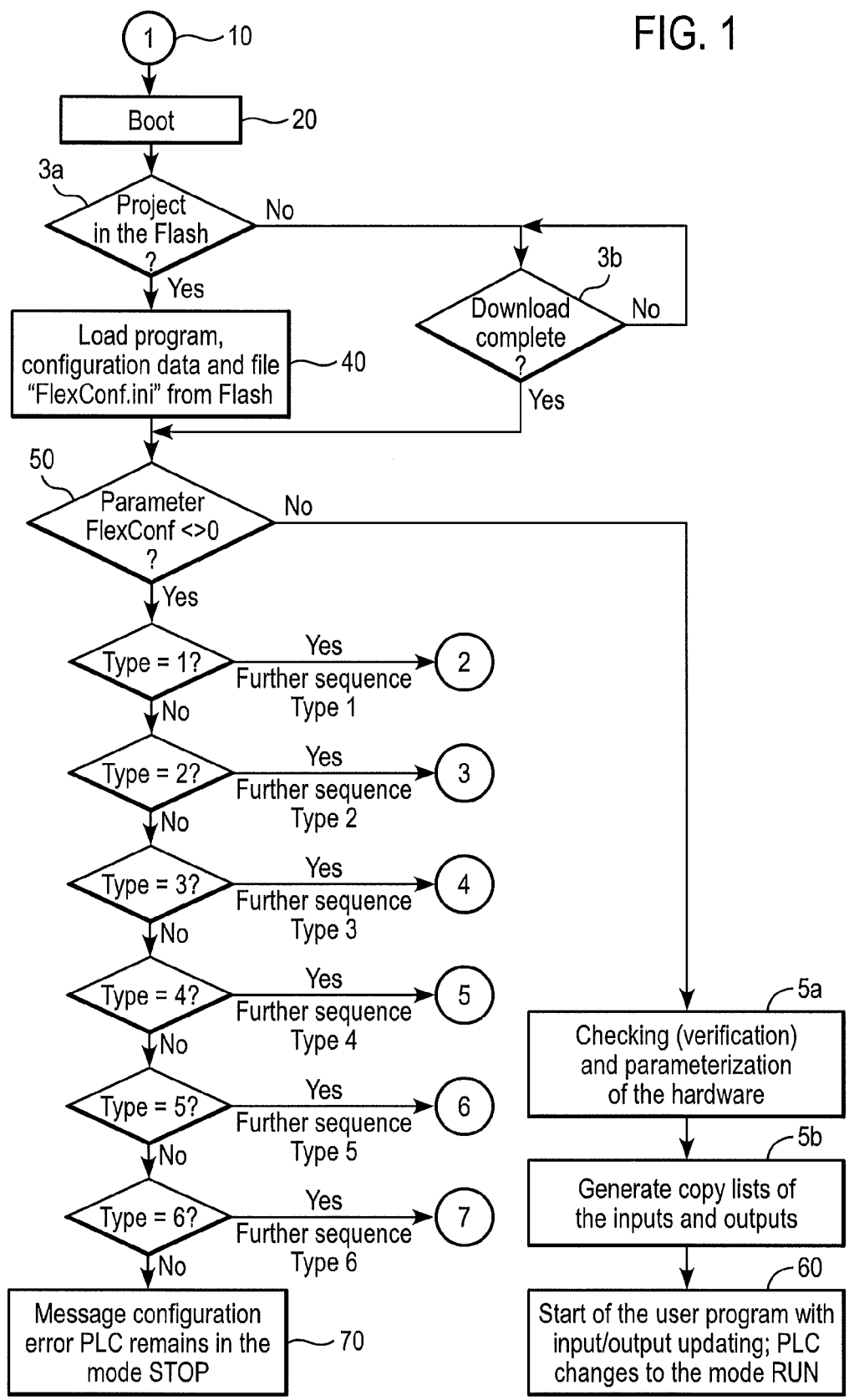
FIG. 1 shows an exemplary sequence of a method for an automation system with a flexible control configuration in accordance with an exemplary embodiment of the present disclosure.

Accordingly, the disclosure is based on the object of specifying a method for the configuration of a control device, in a modularly constructed control or automation system having a flexibly expandable hardware structure, which method has disadvantages over known devices and methods. For example, an exemplary embodiment according to the present disclosure can be suitable for making the configuration of the control device more flexible and more effective, and for simplifying the start-up of the control or automation system. Furthermore, the disclosure relates to an exemplary system for performing the exemplary method and is used in process automation or machine control for controlling processes and/or installation components.

Exemplary embodiments of the present disclosure can be achieved by means of a method for the configuration of a control device of various types mentioned herein.

In accordance with an exemplary method for the configuration of a control device in accordance with the present disclosure, such as a programmable logic controller (PLC), in a modularly constructed, control or automation system having a flexibly expandable hardware structure, a programming tool is connected to the control device, by means of which programming tool a user or control program and corresponding configuration files are transmitted into the control device during the start-up of the control device.

Furthermore, in the programming tool, a first method step involves mapping a control project with the provided hardware devices of the automation system as part of the control project and a combination of the provided hardware devices of the automation system among one another. The control project—stored in the programming tool—of the automation system with the maximum possible hardware expansion of the automation system and a corresponding parameterization is transmitted to the control device of the automation system and stored there in the memory of the control device.

In this case, the parameterization of the control device also comprises the setting of the system parameters. One system parameter is the parameter "FlexControl". The latter serves for setting the control device to the mode "control with flexible configuration" and a type for transmitting modification information into the control device, which will be explained below.

In a second step, in the programming tool, modifications of the provided hardware devices, for example, changes of the hardware used in the automation system relative to the maximum possible hardware expansion stored in the project, by means of modification software "FlexConf.ini" are registered as modification information.

The modification software "FlexConf.ini" is loaded jointly with the control project into the PLC and stored in the internal voltage-secure memory, for example in a flash memory.

The modification software, also designated as file "FlexConf.ini", includes data records. Each data record begins with a data record start identifier, which is identified for example as [Flex_Conf_ID_xxx]. In this case, xxx is the data record number and varies from "000" to "255". This data record number is called FlexConf_ID hereinafter. The data record number FlexConf_ID is transmitted directly to the PLC by means of suitable setting possibilities such as, for example by means of a provided keypad and display on the PLC, by means of a serial data transmission, by means of a data transmission via a network, such as, for example, Ethernet or ARCNET, by means of input combination of the onboard inputs, that is to say inputs of the PLC that are present directly in the control unit, or by means of coding switches provided on the PLC. The transmission type is set in the parameter "FlexControl".

In one exemplary embodiment, a test program can also be run which carries out a check of the file "FlexConf.ini" with regard to syntactic and formal correctness. By way of example, this involves checking whether the respective data record containing the modification information is present in the stored project of the automation system.

A next step involves starting up the control device by loading the user or control program, the configuration files and the modification software with the modification information contained therein, wherein the transmitted configuration data are adapted to the transmitted modification information, copy lists for inputs and outputs of the hardware used are created in accordance with the stored modification information and a parameterization of the hardware is carried out.

In one exemplary method in accordance with the present disclosure, it is only after a test by the firmware installed on the PLC with regard to complete transfer of the modification information, for example in respect of whether the IEC addresses used in the configuration files also actually exist on the hardware used or address overlaps are present, and after subsequent parameterization of the hardware of the automation system that the application program of the control device is started and the control device is converted into the operating mode "RUN".

The file "FlexConf.ini", including the modification software for the modification information of the hardware structure of the control system relative to a maximum possible hardware expansion of the automation system can be created in the Windows INI-Format or XML-Format and is likewise part of the PLC or control project.

Various transmission types 1 to 6 which can be set by means of the parameter "FlexControl" for the purpose of loading the hardware changes relative to a maximum possible hardware expansion of the automation system, that is to say the modification information, are presented hereinafter, the modification information being accessed for example from the flash memory of the PLC, by means of a keypad/display on the PLC or by means of a network protocol.

If transmission type 1 is set in the parameter "FlexControl", in a first embodiment the file "FlexConf.ini", which contains the modification software and is stored in the memory, for example, in the flash memory or other failsafe memory, of the PLC, is loaded into the central processing unit of the PLC. Alternatively, the "FlexConf.ini" can also be concomitantly transmitted into the PLC during the transmission of the control project. The respective FlexConf_ID with the modification information is provided by means of stored settings from the keypad or display of the PLC. If, by way of example, the FlexConf_ID is set to 10 in the keypad, then the data record [FlexConf_ID_10] from the file "FlexConf.ini" is used for determining the changes to the control configuration.

If transmission type 2 is set in the parameter "FlexControl", the file "FlexConf.ini", which contains the modification software and can be stored in the flash memory of the PLC, is loaded during the transmission of the control project into the central processing unit of the PLC or transmitted jointly with the PLC project to the central processing unit of the PLC. The FlexConf_ID is provided by means of a so-called input combination of the onboard inputs, for example, inputs present directly in the control unit. If the so-called input combination of the onboard inputs, for example the FlexConf_ID is set to 10, then the data record [FlexConf_ID_10] from the file "FlexConf.ini" is used for determining the changes to the control configuration.

In the case where transmission type 3 is set in the parameter "FlexControl", the modification information stored in the memory, for example, in the flash memory, of the PLC is provided during the transmission of the control project, for example, in the file "FlexConf.ini", jointly with the PLC project. The FlexConf_ID is transferred by means of provided coding switches of the PLC. If the coding switches are set to the FlexConf_ID_10, for example, then the data record [FlexConf_ID_10] from the file "FlexConf.ini" is used for determining the changes to the control configuration.

If transmission type 4 is set in the parameter "FlexControl" and if the modification information is stored in the memory, for example, in the flash memory, of the PLC, during the transmission of the control project, for example in the file "FlexConf.ini", the modification information is transmitted jointly with the PLC project into the PLC. Firstly the application program is started. However, no input/output data are exchanged yet, since the hardware has not yet been verified and parameterized. It is only after the reception of the FlexConf_ID in the application program that the hardware is verified and parameterized in accordance with the changes and the copy lists for the input/output data are created. In the case of success, the input/output data exchange is started.

In the case where transmission type 5 is set in the parameter "FlexControl", the modification information is transmitted as data records concerning the run time of the application program in the so-called run time mode to the PLC.

If transmission type 6 is selected in the parameter "FlexControl", the modification information is transmitted in the file "FlexConf.ini" by means of a network protocol, e.g. FTP, Modbus, TCP, UDP to the PLC.

The modularly constructed control or automation system according to the disclosure for performing the method according to the disclosure includes a control device, which is provided for the control of processes and/or installation components, with—connected thereto—modules of the central input/output units, which are connected to the first control unit via an internal input/output bus, and optionally with communication couplers, which control the communication via a field bus with a multiplicity of decentralized field bus slaves and input/output units connected thereto.

A programming tool can be connected to the control device, wherein, by means of the programming tool, a user or control program, configuration files and modification software with the modification information contained therein can be transmitted into that. There is stored in the programming tool for this purpose a control project which maps the provided hardware devices of the automation system as part of the control project and a combination of the provided hardware devices of the automation system among one another.

The control project is stored after being loaded into the control device in a manner secure in respect of voltage failure, for example in the flash of the control device. When the control device is started up, the control project is read from the flash and processed.

Furthermore, in the programming tool, modifications of the provided hardware devices, for example changes in the number and/or type of the used hardware devices relative to the maximum possible expansion of the hardware devices of the automation system, which are stored in the control project, by means of the modification software "FlexConf.ini" can be registered as modification information.

In the programming tool, provision is made of a parameter unit for setting the control device which can be connected to the programming tool to the mode "control with flexible configuration" by means of a parameter "FlexControl", wherein a type for transmission of changes in the hardware structure relative to the maximum possible hardware expansion of the automation system is defined in the parameter "FlexControl".

In a first embodiment, the setting of the parameter "FlexControl" and of the transmission type stored in the parameter can be performed by means of a setting possibility on the control unit by means of a provided keypad and/or display on the PLC or by means of coding switches provided on the PLC.

In one exemplary embodiment, the control project with the parameter "FlexControl" with the defined transmission type can also be transmitted into the PLC by means of a serial data transmission or by means of a network present in the automation system, for example Ethernet or ARCNET.

When the control device is started up or after the programming tool has been connected to the control device directly or via the bus system of the automation system, a transmission of the modification software with the modification information stored therein, in accordance with the transmission type previously set in the parameter "FlexControl", to the control device can be performed by loading the user or control program, the configuration files and the modification software with the modification information contained therein. In this case, an adaptation of the transmitted configuration data to the transmitted modification information, a creation of copy lists for inputs and outputs of the used hardware devices in accordance with the stored modification information, a parameterization of the hardware and a conversion of the control device into the operating mode "RUN" are effected.

Special functional modules for the reception of the modification information, of the modification software, for example as files, the FlexConf_ID and of the status of the hardware configuration (verification and parameterization of the hardware of the control system) and also of the input/output data exchange are stored in the application program of the control device.

According to an exemplary embodiment of the present disclosure, the system provides a test with regard to complete transfer of the modification information into the configuration files by means of a test module.

FIG. 1 shows an exemplary sequence of a method for an automation system with a flexible control configuration in accordance with an exemplary embodiment of the present disclosure.

Before the control system can be used and the inputs and outputs of the hardware of the system, which comprises, for example, input units, output units, input and output units, communication couplers and/or control devices, can be addressed, the control device and the input/output units should be configured in accordance with the respective specifications.

According to an exemplary embodiment, upon the control device being started up, for performing a loading of the user or control program, the configuration files and the modification software with the modification information contained therein, wherein the transmitted configuration data in the control device are adapted to the transmitted modification information, copy lists for inputs and outputs of the hardware used in the automation system are created in accordance with the stored modification information and a corresponding parameterization of the hardware is carried out.

In accordance with an exemplary method for the configuration of a control device, the following method steps are performed for this purpose.

In a preparatory step 10, the control device is switched on.

In the subsequent step 20, the boot code of the PLC 1 is run and the control device is prepared for processing the control project.

In accordance with branch 3a illustrated in FIG. 1 a check is then made to determine whether a control project is stored in the memory of the PLC 1 that is secure in respect of voltage failure.

If no control project is present, then the method sequence is interrupted (see branch 3b), until the control project has been loaded into the PLC 1 by means of a connected programming tool, also called engineering tool, for example by means of the control builder used by ABB, which communicates for example by means of a serial data transmission via the bus system of the automation system or via a network present in the automation system, such as Ethernet or ARCNET for example, with the PLC 1 connected thereto.

The control configuration stored in the project can include the maximum possible hardware expansion of the automation system and the setting of the system parameters, information about input/output addresses of the hardware of the system being stored, for example.

In a next step 40, the configuration files stored in the memory of the control device, the control or application program and also a file "FlexConf.ini", having the modification software for the modification information, are loaded from the memory that is secure in respect of voltage failure into the central processing unit (CPU) of the control device. Thus, the project with the modification software file "FlexConf.ini" is now present in the CPU of the control device. In this case, the file "FlexConf.ini" contains the previously registered modifications of the provided hardware devices.

In the subsequent step 50, a check is carried out to determine whether the control device is set to the mode "control with flexible configuration" and a transmission type for loading the hardware changes relative to a maximum possible hardware expansion of the automation system is set in the parameter "FlexControl". If the parameter "FlexControl" is not set to "control with flexible configuration", a subsequent step 5*a* involves carrying out the checking (verification) and parameterization of the hardware and a step 5*b* involves parameterizing the input/output units in accordance with the control configuration, as known from the prior art. If the hardware used in the system corresponds to the project-planned hardware in the control configuration, the control or application program of the PLC 1 is started in a concluding step 60, the input and output data of the hardware of the automation system are updated and the PLC 1 changes to the mode "RUN".

FIGS. 2 to 7 describe by way of example the parameters "FlexControl" with adjustable transmission types for loading the hardware changes relative to a maximum possible hardware expansion of the automation system, designated as modification information hereinafter.

If the control device is set to an exemplary mode "control with flexible configuration", according to the disclosure, in accordance with the previously selected transmission type Type=1, Type=2, Type=3, Type=4, Type=5, Type=6, the modification information in the file FlexConf.ini is transmitted to the control unit.

In an exemplary embodiment disclosed herein, it is provided that, in the absence of selection of one of the transmission types Type=1, Type=2, Type=3, Type=4, Type=5, Type=6 which are described in FIGS. 2 to 7, an error message "configuration error" is automatically generated and/or displayed and the control device remains in the operating mode "STOP".

FIGS. 2 to 7 illustrate and describe the transmission of the modification information in accordance with the transmission types set in the parameter "FlexControl", Type=1, Type=2, Type=3, Type=4, Type=5, Type=6, respectively proceeding from the junction points 2, 3, 4, 5, 6 and 7.

Figure 2:
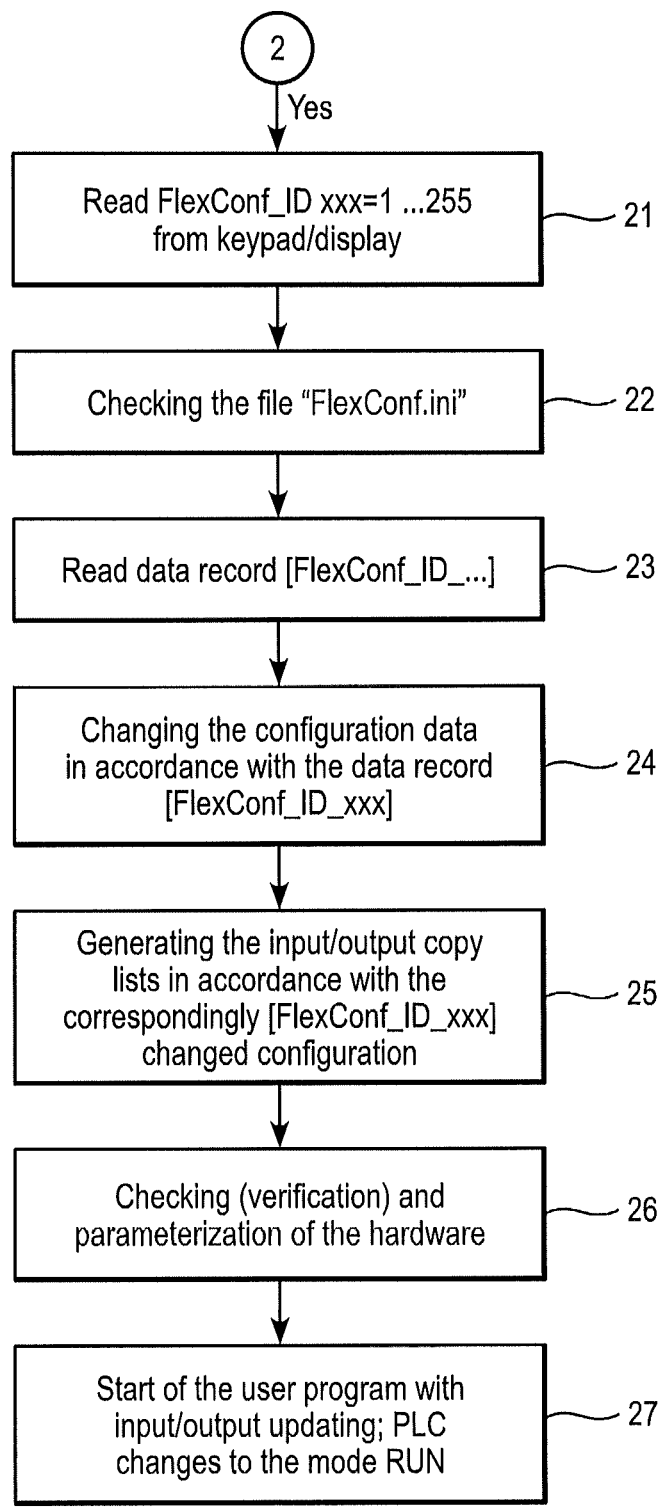
FIG. 2 shows an exemplary sequence of a method, wherein the transmission of the modification information is performed based on a transmission type 1 in accordance with an exemplary embodiment of the present disclosure.

FIG. 2 shows an exemplary sequence of a method, wherein the transmission of the modification information is performed based on a transmission type 1 in accordance with an exemplary embodiment of the present disclosure.

Proceeding from the junction point 2 in FIG. 1, the modification information "FlexConf.ini" is stored in the flash memory of the PLC 1. For this purpose, the data record number FlexConf_ID 1 . . . 255 is read from the Display/Keypad of the PLC 1. If, by way of example, the FlexConf_ID is set to 10 in the keypad, then the data record [FlexConf_ID_10] from the file "FlexConf.ini" is used for determining the changes to the control configuration.

In a subsequent step 22, the file "FlexConf.ini" is checked with regard to syntactic and formal correctness. By way of example, this involves checking whether the respective data record is present in the stored project.

The modification information stored in the file "FlexConf.ini" is registered as data records [FlexConf_ID_xxx] in a further step 23. In this case, xxx is for example a number between 001 . . . 255 and corresponds to a value of the FlexConf_ID. All changes of the hardware for a modification relative to the maximum expansion of the control system are thus entered under the main entry [FlexConf_ID_xxx].

After the modification information has been registered as data records [FlexConf_ID_xxx] of the file "FlexConf.ini" in step 23 in such a way that all changes for a modification of the hardware are entered in the data records [FlexConf_ID_xxx], in a subsequent step 24 the configuration files stored in the project are adapted in accordance with the read-in data records [FlexConf_ID_xxx] of the file "FlexConf.ini".

A step 25 involves creating copy lists for the input/output data of the inputs and outputs of the used hardware of the automation system in accordance with the data records [FlexConf_ID_xxx] stored in the file "FlexConf.ini", in which the modification information is stored.

After a test by the firmware stored in the PLC 1 with regard to complete transfer of the modification information, for example to determine whether the IEC addresses used in the configuration files also actually exist on the hardware used or address overlaps are present, and after parameterization of the hardware of the automation system in a penultimate step 26, the application program of the control device is started in a last step 27 and the control device is converted into the operating mode "RUN".

Figure 3:
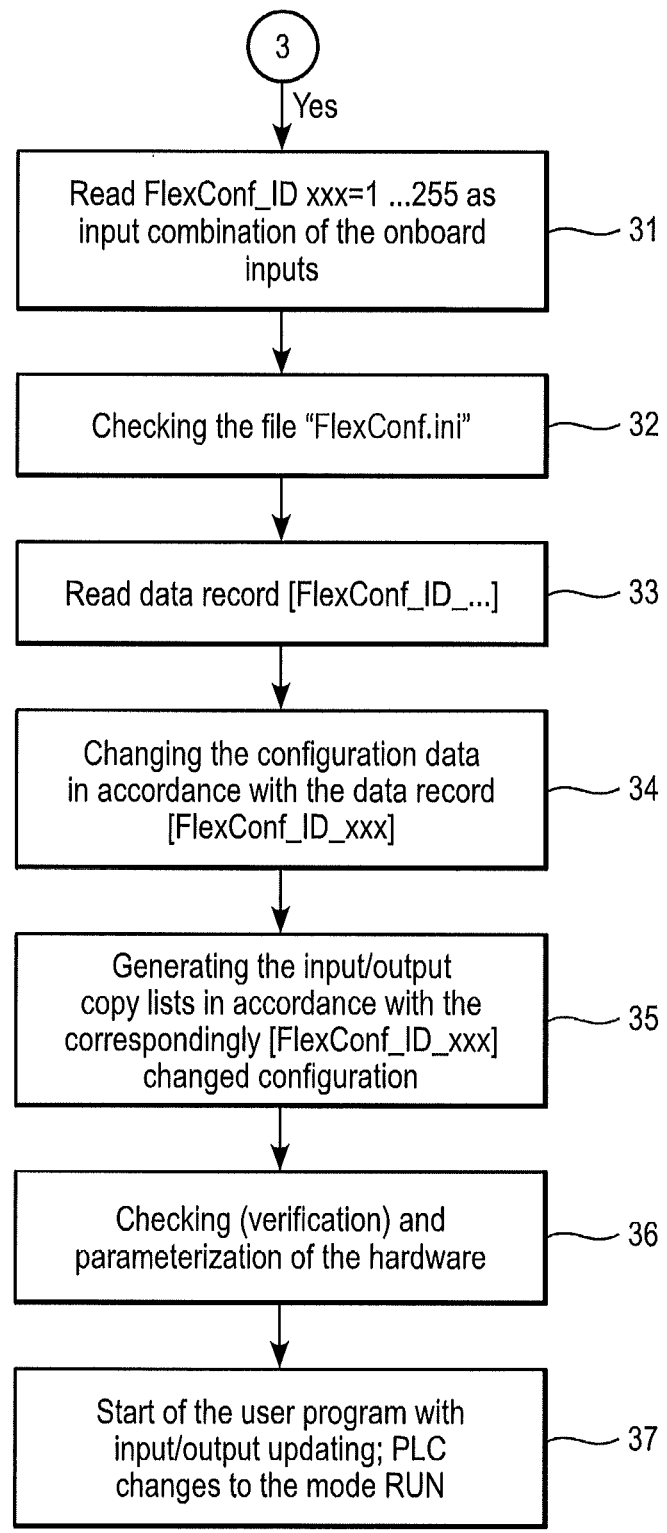
FIG. 3 shows an exemplary sequence of a method, wherein the transmission of the modification information is performed based on a transmission type 2 in accordance with an exemplary embodiment of the present disclosure.

FIG. 3 shows an exemplary sequence of a method, wherein the transmission of the modification information is performed based on a transmission type 2 in accordance with an exemplary embodiment of the present disclosure Proceeding from the junction point 3 in FIG. 1, in accordance with transmission type 2, the modification information is stored in the flash memory of the PLC 1 and is provided during the transmission of the control project in the file "FlexConf.ini" jointly with the project into the PLC 1. The data record number FlexConf_ID is provided by means of the input combination of the onboard inputs, that is to say by means of inputs present directly in the control unit. If the data record number FlexConf_ID is set to 10, for example, by means of the so-called input combination of the onboard inputs, then the data record [FlexConf_ID_10] from the file "FlexConf.ini" is used for determining the changes to the control configuration.

In a subsequent step 32, the file "FlexConf.ini" is checked, as described above in FIG. 2.

In a further step 33, the modification information stored in the file "FlexConf.ini" is registered as data records [FlexConf_ID_xxx], as already described in FIG. 2, and entered as modification information for a modification relative to the maximum expansion of the control system.

After the modification information has been registered as data records [FlexConf_ID_xxx] of the file "FlexConf.ini" in step 33, in a subsequent step 34 the configuration files stored in the project are adapted in accordance with the read-in data records [FlexConf_ID_xxx] of the file "FlexConf.ini".

A step 35 involves creating, as described in FIG. 2, copy lists for the input/output data of the inputs and outputs of the used hardware of the automation system in accordance with the data records [FlexConf_ID_xxx] stored in the file "FlexConf.ini".

After a test with regard to complete transfer of the modification information in a penultimate step 36, the application program of the control device is started in a last step 37 and the control device is converted into the operating mode "RUN".

Figure 4:
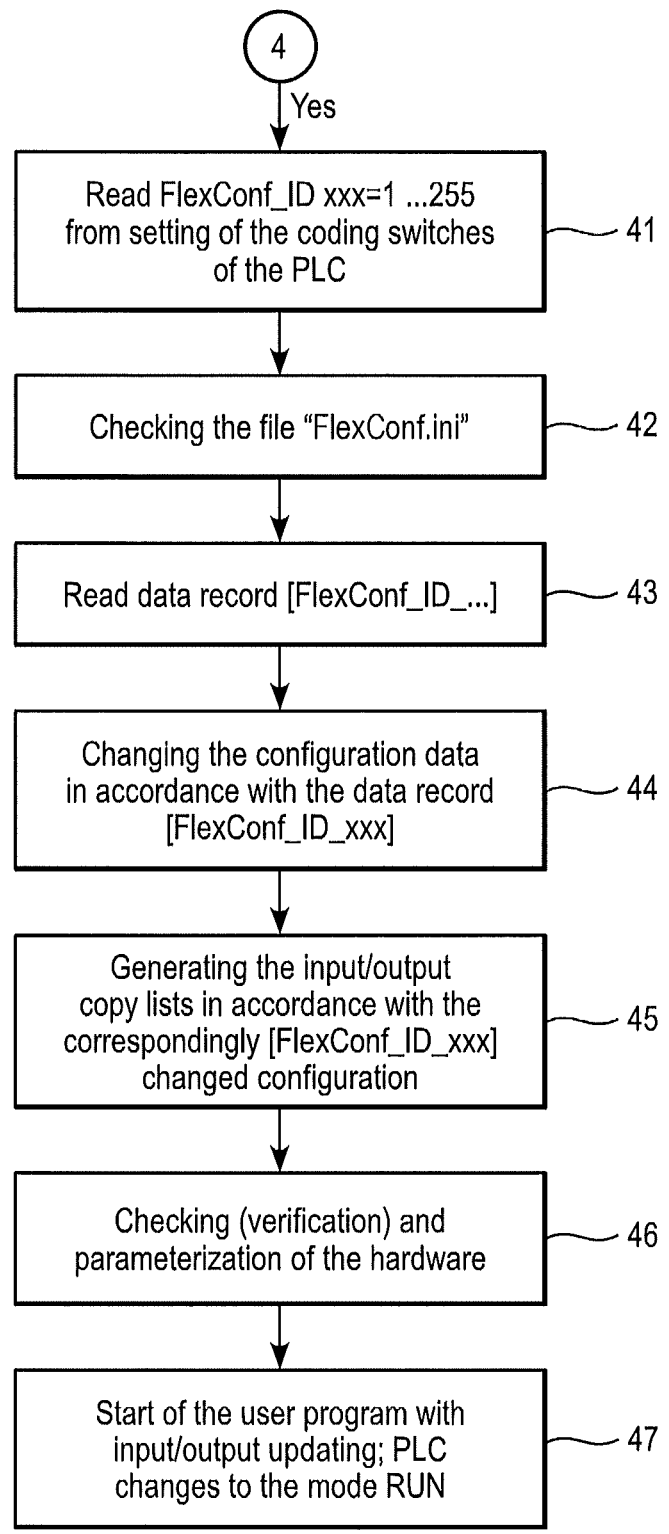
FIG. 4 shows an exemplary sequence of a method, wherein the transmission of the modification information is performed based on a transmission type 3 in accordance with an exemplary embodiment of the present disclosure.

FIG. 4 shows an exemplary sequence of a method, wherein the transmission of the modification information is performed based on a transmission type 3 in accordance with an exemplary embodiment of the present disclosure Proceeding from the junction point 4 in FIG. 1, in accordance with transmission type 3, the modification information is stored in the flash memory of the PLC 1 and is transferred during the transmission of the control project in the file "FlexConf.ini" jointly with the project into the PLC 1. The data record number FlexConf_ID is determined from the settings of the coding switches of the PLC 1.

In a subsequent step 42, the file "FlexConf.ini" is checked, as described above in FIG. 2.

In a further step 43, the data record [FlexConf_ID_xxx] having the data record number xxx=FlexConf_ID is read from the file "FlexConf.ini". The data record contains, as already described in FIG. 2, the modification information for a modification relative to the maximum expansion of the control system.

Afterwards, in a subsequent step 44, the configuration files stored in the project are adapted in accordance with the read-in data record [FlexConf_ID_xxx] of the file "FlexConf.ini" and a step 35 involves creating, as described in FIG. 2, copy lists for the input/output data of the inputs and outputs of the used hardware of the automation system in accordance with the data records [FlexConf_ID_xxx] stored in the file "FlexConf.ini".

After a test with regard to complete transfer of the modification information in a penultimate step 46, the application program of the control device is started in a last step 47 and the control device is converted into the operating mode "RUN".

In the case of transmission types Type=4, Type=5, Type=6 described in the following FIGS. 5, 6 and 7, firstly the application program is started in steps 51, 61, 71. However, no input/output data are exchanged yet, since the hardware has not yet been verified and parameterized.

Figure 5:
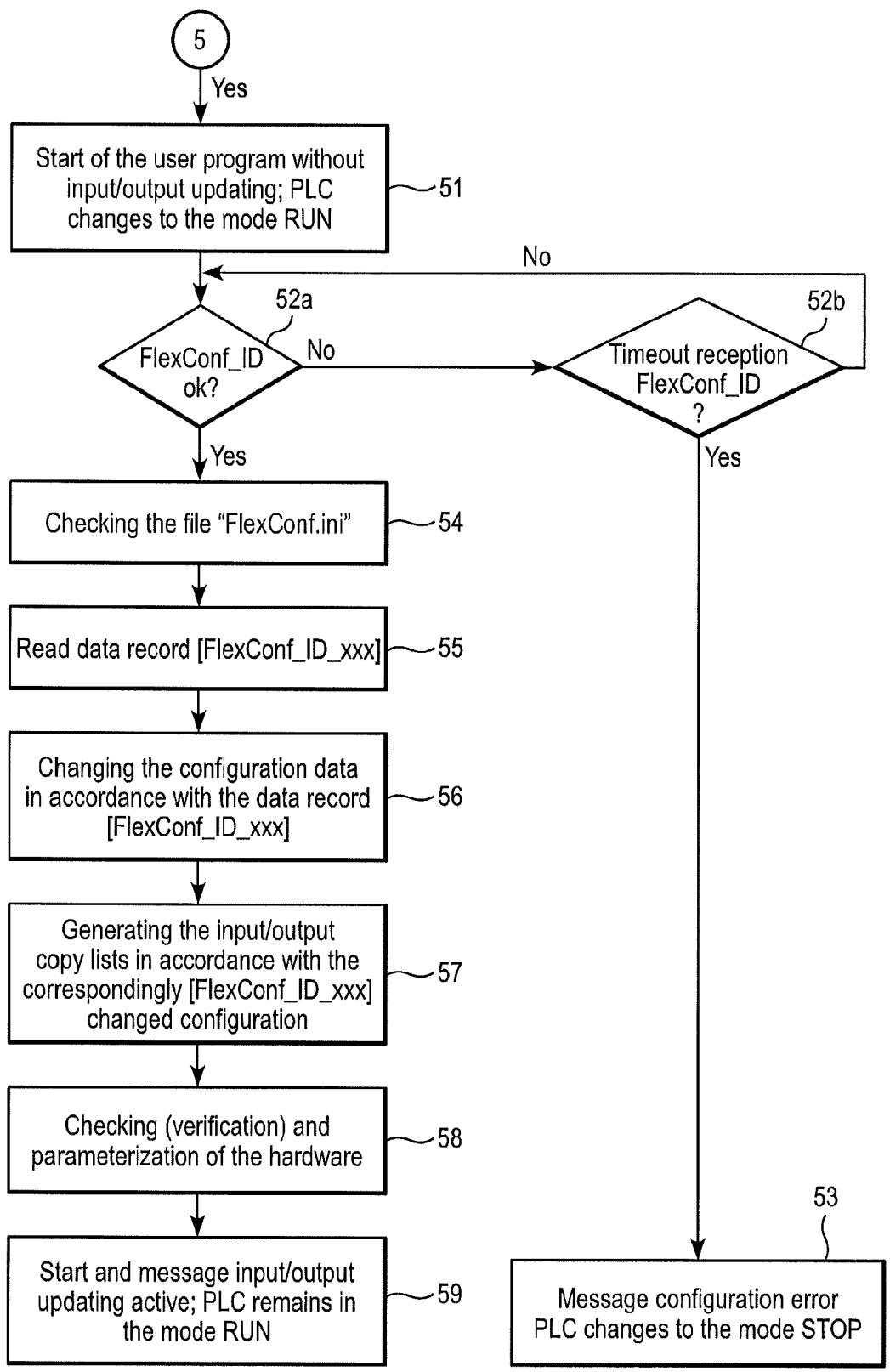
FIG. 5 shows an exemplary sequence of a method, wherein the transmission of the modification information is performed based on a transmission type 4 in accordance with an exemplary embodiment of the present disclosure.

As shown in FIG. 5, transmission type 4 is set in the parameter "FlexControl" and the modification information is stored in the memory, such as in the flash memory, of the PLC 1. During the transmission of the control project, for example in the file "FlexConf.ini", the modification information is transmitted jointly with the PLC project into the PLC 1. As shown in FIG. 5, transmission type 4 is set in the parameter "FlexControl" and the modification information is stored in the memory, such as in the flash memory, of the PLC 1. During the transmission of the control project, for example in the file "FlexConf.ini", the modification information is transmitted jointly with the PLC project into the PLC 1.

Proceeding from the junction point 4 in FIG. 1, firstly the application program is started in step 51. The control device changes to the operating mode "RUN". At this point in time no input/output data are exchanged yet, since the hardware of the control system has not yet been verified and parameterized.

The branch 52a illustrated in FIG. 5 shows that firstly a check is made to determine whether the transmission of the data record number "FlexConf_ID" was performed successfully within a predetermined time period. If the data record number "FlexConf_ID" was not completely transmitted within the predetermined time period and if no more activity with regard to the transmission of the parameter "FlexConf_ID" can be ascertained, (see branch 52b) the time monitoring—designated by "Timeout"—of the control unit responds and, in a step 53, the message "configuration error" is output and the control device changes to the operating mode "STOP".

If the data record number "FlexConf_ID" was transmitted successfully within a predetermined time period (branch 52a), a next step 54 involves performing a check of the file "FlexConf.ini" with regard to syntactic and formal correctness in accordance with step 22 in FIG. 2.

In a further step 55, the data record [FlexConf_ID_xxx] having the data record number xxx=FlexConf_ID is read from the file "FlexConf.ini". The data record contains, as already described in FIG. 2, entries concerning the modification information for a modification relative to the maximum expansion of the control system.

After the modification information has been read as the data record [FlexConf_ID_xxx] from the file "FlexConf.ini" in step 55, a subsequent step 56 involves adapting the configuration files stored in the project in accordance with the read-in data record [FlexConf_ID_xxx] of the file "FlexConf.ini". In other words, it is only after the reception of the data record number FlexConf_ID in the application program that the hardware is verified and parameterized in accordance with the changes and the copy lists for the input/output data are created and the input/output data exchange is started.

This is illustrated in a step 57 and is performed, as described in FIG. 2, to the effect that copy lists for the input/output data of the inputs and outputs of the used hardware of the automation system are created in accordance with the data records [FlexConf_ID_xxx] stored in the file "FlexConf.ini".

It is only after reception of the modification information or change data and after a test with regard to complete transfer of the modification information in a penultimate step 58 that, in a last step 59, the exchange of the input and output data in accordance with the predetermined modification information with the application program running is activated and the control device remains in the operating mode "RUN".

Figure 6:
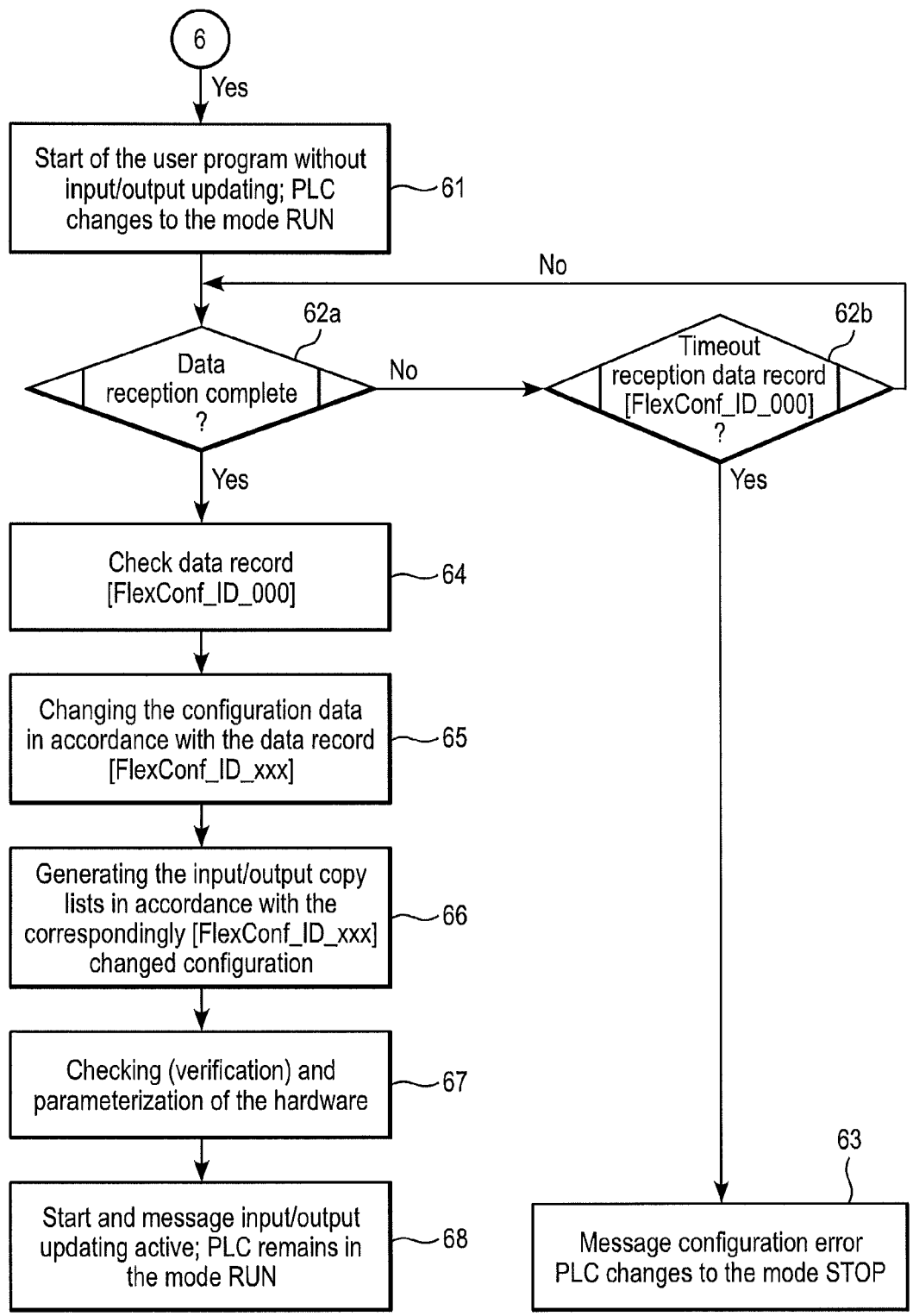
FIG. 6 shows an exemplary sequence of q method, wherein the transmission of the modification information is performed based on a transmission type 5 in accordance with an exemplary embodiment of the present disclosure.

FIG. 6 shows an exemplary sequence of q method, wherein the transmission of the modification information is performed based on a transmission type 5 in accordance with an exemplary embodiment of the present disclosure.

Proceeding from the junction point 6 in FIG. 1, firstly the application program is started in step 61. The control device changes to the operating mode "RUN". At this point in time, no input/output data are exchanged yet, since the hardware of the control system has not yet been verified and parameterized.

In accordance with transmission type 5, now all changes of the hardware relative to the maximum possible expansion of the automation system, or a modification of the used hardware, under a main entry, for example [FlexConf_ID_000], as a data record, are transmitted directly to the PLC 1.

The branch 62a illustrated in FIG. 6 shows that firstly a check is made to determine whether the transmission of the modification information was performed successfully within a predetermined time period. If the data record or the main entry [FlexConf_ID_000] was not completely transmitted within the predetermined time period and if no more activity with regard to the transmission can be ascertained, (see branch 62b) the time monitoring—designated by "Timeout"—of the control unit responds and, in a step 63, the message "configuration error" is output and the control device changes to the operating mode "STOP".

After complete reception of the modification information within a predetermined time period (see branch 62a), a next step 64 involves performing a check of the data record [FlexConf_ID_000] with regard to syntactic and formal correctness.

After the modification information, concerning for example the modification of a unit type, has been completely transmitted as a data record under the main entry [FlexConf_ID_000] concerning the run time of the application program in the run mode directly to the PLC 1, for example by means of a serial data transmission via the bus system of the automation system or via a network present in the automation system, such as Ethernet or ARCNET, for example, a subsequent step 65 involves adapting the configuration files stored in the project in accordance with the read-in data record [FlexConf_ID_000]. A further step 66 involves creating input/output copy lists in accordance with the data record [FlexConf_ID_000] with the modification information for the input/output data.

In a next step 67, the hardware is verified and parameterized in accordance with the modification information.

Afterwards, in a last step 68, the exchange of the input and output data in accordance with the predetermined modification information is started and the control device remains in the operating mode "RUN".

Figure 7:
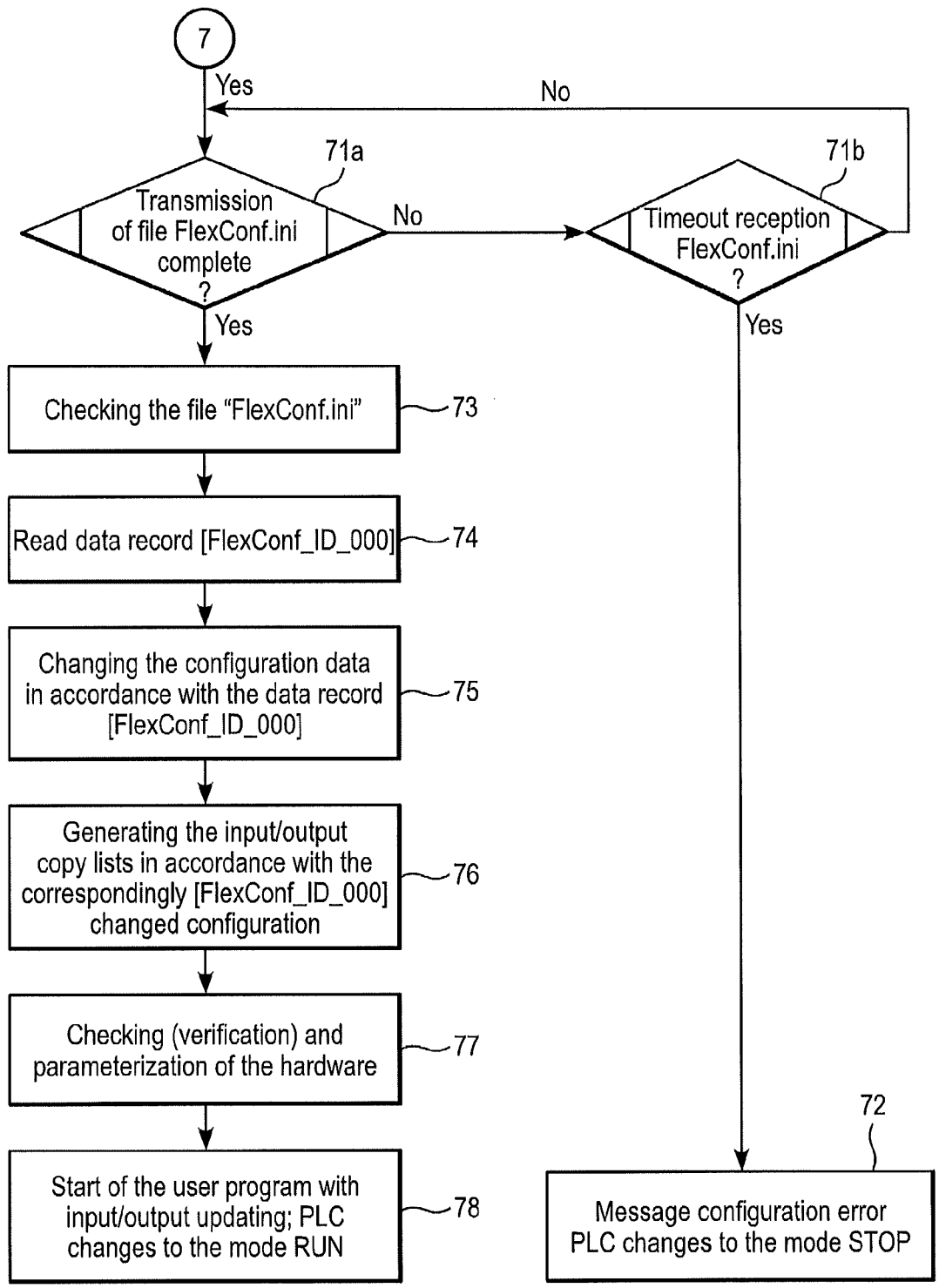
FIG. 7 shows an exemplary sequence of a method, wherein the transmission of the modification information is performed based on a transmission type 6 in accordance with an exemplary embodiment of the present disclosure.

FIG. 7 shows an exemplary sequence of a method, wherein the transmission of the modification information is performed based on a transmission type 6 in accordance with an exemplary embodiment of the present disclosure.

Proceeding from the junction point 7 in FIG. 1, after the start of the application program in a first step 71 the file "FlexConf.ini" with the modification information is transmitted or read in by means of a network protocol, for example FTP, to the control device. At this point in time, no input/output data are exchanged yet, since the hardware of the control system has not yet been verified and parameterized.

The branch 71*a* illustrated in FIG. 7 shows that firstly a check is made to determine whether the transmission of the file "FlexConf.ini" was performed successfully within a predetermined time period. If, within the predetermined time period, no more activity with regard to the transmission of the file "FlexConf.ini" can be ascertained (see branch 71*b*), the time monitoring—designated by "Timeout"—of the control unit responds and, in a step 72, the message "configuration error" is output and the control device changes to the operating mode "STOP".

After complete transmission of the file "FlexConf.ini" with the modification information within a predetermined time period (see branch 71*a*), a next step 73 involves performing once again a check of the file "FlexConf.ini" with regard to syntactic and formal correctness.

The subsequent step 74 involves reading the modification information, that is to say a modification of the used hardware, under a main entry, for example [FlexConf_ID__000] directly into the control device.

It is only after the change of the configuration data depending on the modification information [FlexConf_ID__000] in a next step 75 that, in a further step 76, copy lists for the input/output data are produced in accordance with the changed configuration.

In a subsequent step 77, the hardware is verified and parameterized in accordance with the modification information. For this purpose, special functional modules for the verification and parameterization of the hardware configuration are stored in the application program of the PLC 1.

Afterwards, in a last step 78, the application program is started with an updating of the input and output data in accordance with the predetermined modification information and the control device changes to the operating mode "RUN".

Figure 8:
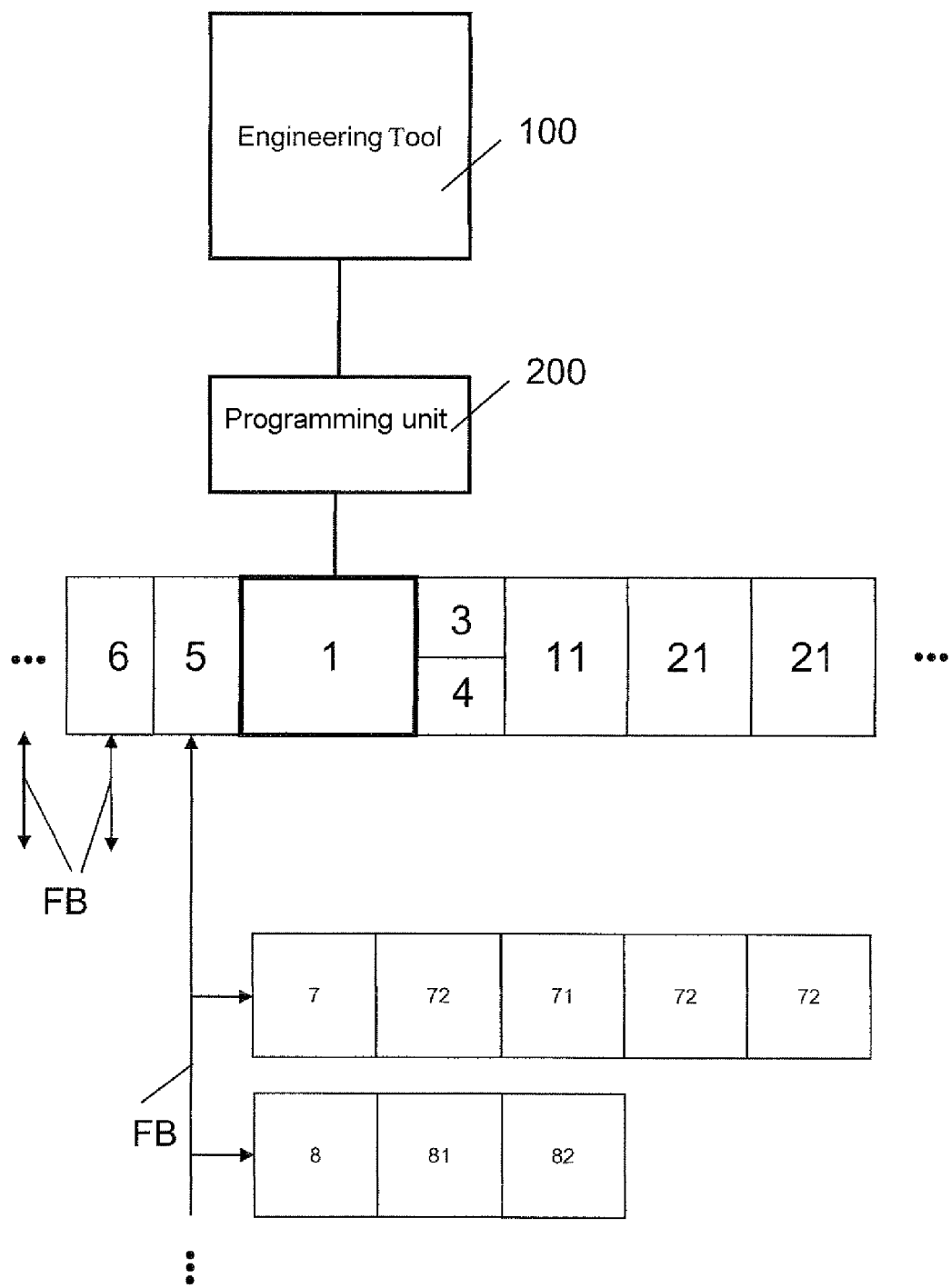
FIG. 8 shows an example of a modularly constructed control or automation system in accordance with an exemplary embodiment of the present disclosure.

FIG. 8 shows an example of a modularly constructed control or automation system in accordance with an exemplary embodiment of the present disclosure. As shown in FIG. 8 a modularly constructed control or automation system for performing the exemplary method disclosed herein includes a control device 1, which is provided for the control of processes and/or installation components, with—connected thereto—modules of the central input/output units 11, 21, which are connected to the first control unit via an internal input/output bus, and optionally with communication couplers 5, 6, which control the communication via a field bus FB with a multiplicity of decentralized field bus slaves 7, 8 and input/output units 71, 72, 81, 82 connected thereto. The abovementioned components are also designated hereinafter as hardware 5, 6, 7, 8, 11, 21, 71, 72, 81, 82.

The first control unit 1 forms with a voltage supply unit 3 and a display and/or operating unit 4 a module for the central processing unit of the control system.

For the configuration of the control device 1, the latter is set by means of a specific parameter, also called "FlexControl" hereinafter, to the mode "control with a flexible configuration", by means of the operating unit 4 and in the parameter a type is predetermined which defines how the transmission of the hardware change relative to a maximum possible hardware expansion of the automation system, designated as modification information hereinafter, into the control device 1 should be performed.

The control device 1 interacts with a programming tool 100, in which a control project of the automation system with the maximum possible hardware expansion of the automation system with a corresponding parameterization is stored and is transmitted to the control device of the automation system and is stored there in the memory of the control device.

The programming tool 100 is furthermore provided for registering the changes of the hardware 5, 6, 7, 8, 11, 21, 71, 72, 81, 82 used in the automation system relative to the maximum possible hardware expansion stored in the project, and for transmitting them to the control device 1 by loading a user or control program, configuration files and the modification software with the modification information contained therein serially or via a network connected to the control device 1.

An adaptation of the configuration data to the transmitted modification information is followed by a creation of copy lists for inputs and outputs of the used hardware 5, 6, 7, 8, 11, 21, 71, 72, 81, 82 in accordance with the stored modification information, a test with regard to complete transfer of the modification information into the configuration files, a parameterization of the hardware 5, 6, 7, 8, 11, 21, 71, 72, 81, 82 and the start of the application program of the control device, and also a conversion of the control device into the operating mode "RUN".

Figure 9:
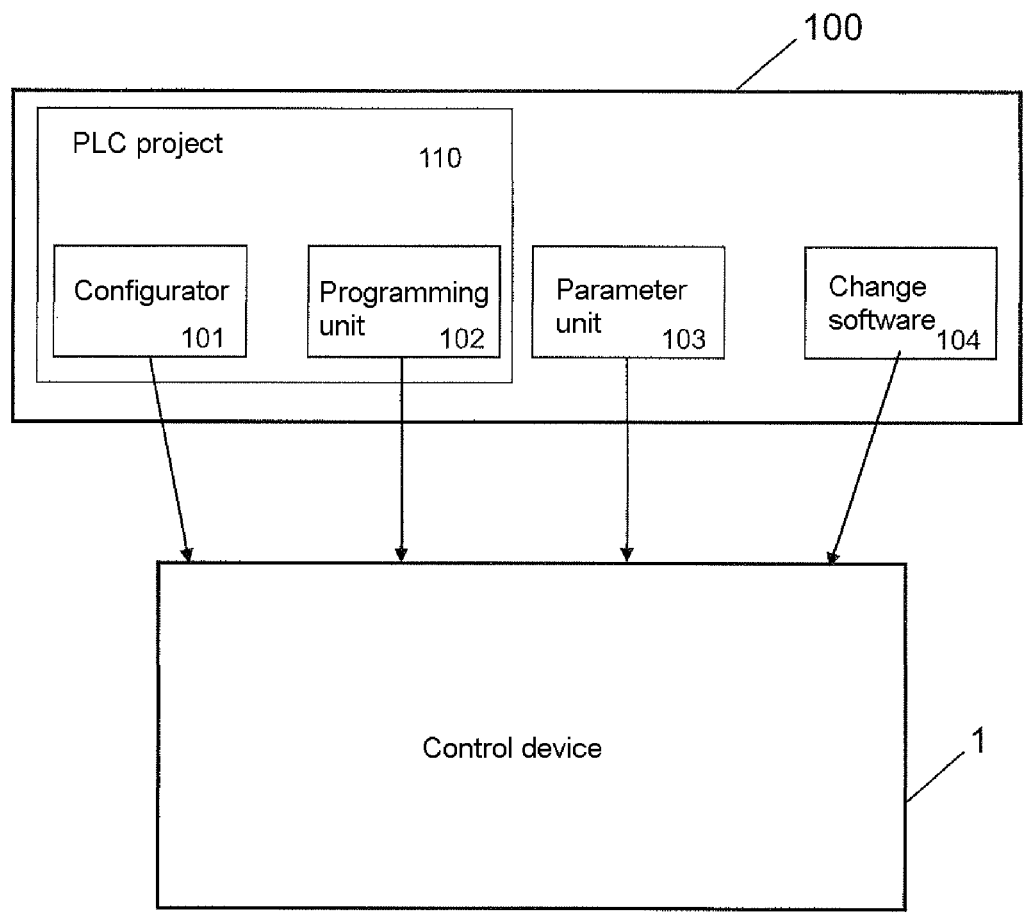
FIG. 9 shows a system for performing a method in accordance with an exemplary embodiment of the present disclosure.

FIG. 9 shows a system for performing a method in accordance with an exemplary embodiment of the present disclosure. As shown in FIG. 9, the system includes a control device 1 and a programming tool 100 connected thereto, wherein, from the programming tool 100, a user or control program with a corresponding parameterization, configuration files and a modification software 104 with the modification information contained therein can be transmitted into the control device 1 via a serial interface or via a network connected to the control device 1.

A control project 110 is stored in the programming tool 100, said control project mapping the hardware of the automation system as part of a control project 110. For this purpose, in the control project 110, by means of a first software module 101, also called configurator, there is stored a maximum possible expansion stage of the hardware devices provided in the automation system with a corresponding parameterization, which is transmitted to the control device of the automation system and is stored there in the memory of the control device. Furthermore, the control project 110 includes a second software module 102, also called programming unit, in which a combination of the provided hardware devices of the automation system among one another is programmed.

The programming tool 100 includes a third software module, which is provided for registering modifications of the provided hardware devices, for example changes in the number and/or type of the used hardware devices relative to the maximum possible expansion of the hardware devices of the automation system, which are stored in the control project 110, by means of the modification software 104 "FlexConf.ini". The changes concerning the used hardware devices relative to the maximum possible expansion of the hardware devices are also designated hereinafter as modification information.

Furthermore, a parameter unit 103 for setting the control device 1 which is connectable to the programming tool 100 to the mode "control with flexible configuration" by means of a parameter "FlexControl" is provided in the programming tool 100. A type for the transmission of changes in the hardware structure relative to the maximum possible hardware expansion of the automation system can be defined in the parameter "FlexControl".

According to an exemplary embodiment of the present disclosure, the programming tool 100 can perform, directly or via the bus system of the automation system, a transmission of the modification software 104 or the data record number FlexConf_ID with the modification information stored therein in accordance with the transmission type previously set in the parameter "FlexControl" to the control device 1 by loading the user or control program, the configuration files and the modification software 104 with the modification information contained therein, wherein the transmitted configuration data into the control device are adapted to the transmitted modification information, copy lists for inputs and outputs of the used hardware are created in accordance with the stored modification information, a test with regard to complete transfer of the modification information into the configuration files and a parameterization of the hardware are carried out, and, after the start of the application program, the control device 1 is converted into the operating mode "RUN".

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for configuring a control device in an automation system having a flexibly expandable hardware structure, the hardware structure including a programming tool, which is connected to the control device and transmits a user or control program and configuration files, and in the programming tool includes a control project with hardware devices of the automation system and a combination of the hardware devices of the automation system among one another is mapped, the method comprising:

registering, in the programming tool, modifications of the hardware devices as modification information, wherein the modifications are made using modification software "FlexConf.ini";

setting, in a parameter unit, the control device to be connected to the programming tool to Control with flexible configuration mode, using a parameter "FlexControl";

determining a type for the transmission of the modification information in the parameter "FlexControl";

storing, in the programming tool, the modification software with the modification information in accordance with a transmission type previously set in the parameter "FlexControl" for transmission to the control device; and transmitting, to the control device, the user or control program, the configuration files, and the modification software with the modification information contained therein, wherein the transmitted configuration files in the control device are adapted to the transmitted modification information, copy lists for inputs and outputs of the hardware used are created in accordance with the stored modification information, so that the hardware structure is parameterized.

2. The method according to claim 1, wherein a test with regard to at least one of complete and syntactic and formal correctness of the transfer of the modification information into the configuration files is performed by means of a test module.

3. The method according to claim 1, wherein in the parameter "FlexControl" a transmission type is set and the modification information stored in the memory of the control device is provided during transmission of the control project for the control device and a data record number FlexConf_ID for selecting the data record from a file FlexConf.ini is provided by means of stored settings from the keypad or display of the control device.

4. The method according to claim 3, wherein absent a selection of the transmission type, an error message is at least one of automatically generated and displayed and the control device remains in a "STOP" operating mode.

5. The method according to claim 1, wherein in the parameter "FlexControl", a transmission type is set and the modification information stored in the memory of the control device is provided during transmission of the control project for the control device as a file "FlexConf.ini" jointly with the project for the control device and a data record number FlexConf_ID for selecting the data record from the file FlexConf.ini is provided through at least one of the onboard inputs.

6. The method according to claim 5, wherein absent a selection of the transmission type, an error message is at least one of automatically generated and displayed and the control device remains in a "STOP" operating mode.

7. The method according to claim 1, wherein in the parameter "FlexControl", a transmission type is set and the modification information stored in the memory of the control device is provided during the transmission of the control project as a file "FlexConf.ini" jointly with the project and the data record number FlexConf_ID for selecting the data record from the file FlexConf.ini is provided by means of coding switches of the control device.

8. The method according to claim 7, wherein absent a selection of the transmission type, an error message is at least one of automatically generated and displayed and the control device remains in a "STOP" operating mode.

9. The method according to claim 1, wherein in the parameter "FlexControl" a transmission type is set and the modification information stored in memory of the control device is received during the transmission of the control project as a file "FlexConf.ini" jointly with the project into the control device and a data record number FlexConf_ID for selecting the data record from the file FlexConf.ini is received by means of the application program stored in the control device.

10. The method according to claim 9, wherein absent a selection of the transmission type, an error message is at least one of automatically generated and displayed and the control device remains in a "STOP" operating mode.

11. The method according to claim 1, wherein in the parameter "FlexControl" a transmission type is set and the modification information is transmitted as a data record concerning a run time of the application program in a run mode to the control device.

12. The method according to claim 11, wherein absent a selection of the transmission type, an error message is at least one of automatically generated and displayed and the control device remains in a "STOP" operating mode.

13. The method according to claim 1, wherein in the parameter "FlexControl" a transmission type is set and the modification information is transmitted as a file "FlexConf.ini" by means of a network protocol to the control device.

14. The method according to claim 13, wherein absent a selection of the transmission type, an error message is at least one of automatically generated and displayed and the control device remains in a "STOP " operating mode.

15. The system according to claim 14, wherein a test with regard to complete transfer of the modification information into the configuration files by means of a test module is provided.

16. The method according to claim 1, comprising:
creating a file (FlexConf.ini) that includes changes in the hardware structure of the control system relative to a maximum possible hardware expansion of the automation system in Windows INI-Format or XML-Format.

17. The system according to claim 16, wherein the hardware of the automation system comprises input units, output units, input and output units, communication couplers and/or control devices.

18. The method according to claim 1, comprising:
running a test program to check the transmitted modification information with regard to syntactic and formal correctness.

19. The method according to claim 18, wherein the test with regard to complete transfer of the modification information involves checking whether IEC addresses used in the configuration files are also present at the hardware used and/or address overlaps are present.

20. The method according to claim 1, wherein functional modules for reception of the modification information as a data record FlexConf_ID and of a status of the hardware configuration and also of an input/output data exchange are stored in the application program of the control device.

21. A system for configuring a control device in an automation system, comprising:
a flexibly expandable hardware structure; and
a programming tool connected to the hardware structure and the control device, the programming tool being configured to transmit a user or control program and configuration files to a control device, and store the control project in memory,
wherein the control project maps hardware devices of the automation system to the control project and a combination of hardware devices of the automation system to one another,
wherein the programming tool is configured to register modifications of the provided hardware devices as modification information, wherein the modifications are made using modification software "FlexConf.ini" and, set the control device to a mode "control with flexible configuration" via a parameter "FlexControl" using a parameter unit, determine a type for the transmission of the modification information in the parameter "FlexControl" , transmit the modification software with the modification information stored therein in accordance with the transmission type set in the parameter "FlexControl" to the control device,
wherein the control device is configured with the control program, the configuration files, the modification software with the modification information contained therein, and an adaptation of the transmitted configuration files to the transmitted modification information, to establish copy lists for inputs and outputs of the used hardware devices in accordance with the stored modification information such that the hardware devices are parameterzied and the control device transitions into a "RUN" operating mode.

22. A computer readable non-transitory medium for performing a method of configuring a control device in an automation system, having a flexibly expandable hardware structure, the hardware structure including a programming tool, which is connected to the control device and transmits a user or control program and configuration files, and in the programming tool includes a control project with hardware devices of the automation system and a combination of the hardware devices of the automation system among one another is mapped, which when the computer readable medium is placed in communicable contact with a processor of the programming tool, causes the programming tool to perform the steps of:
registering modifications of the hardware devices as modification information, wherein the modifications are made using modification software "FlexConf.ini"
setting the control device to be connected to the programming tool to Control with flexible configuration mode, using a parameter "FlexControl";
determining a type for the transmission of the modification information in the parameter "FlexControl";
storing the modification software with the modification information in accordance with a transmission type previously set in the parameter "FlexControl" for transmission to the control device; and
transmitting, to the control device, the user or control program, the configuration files, and the modification software with the modification information contained therein, to establish copy lists for inputs and outputs of the hardware structure used, parameterize the hardware structure, and place the control device into a "RUN" operating mode.

* * * * *